Figure 1:
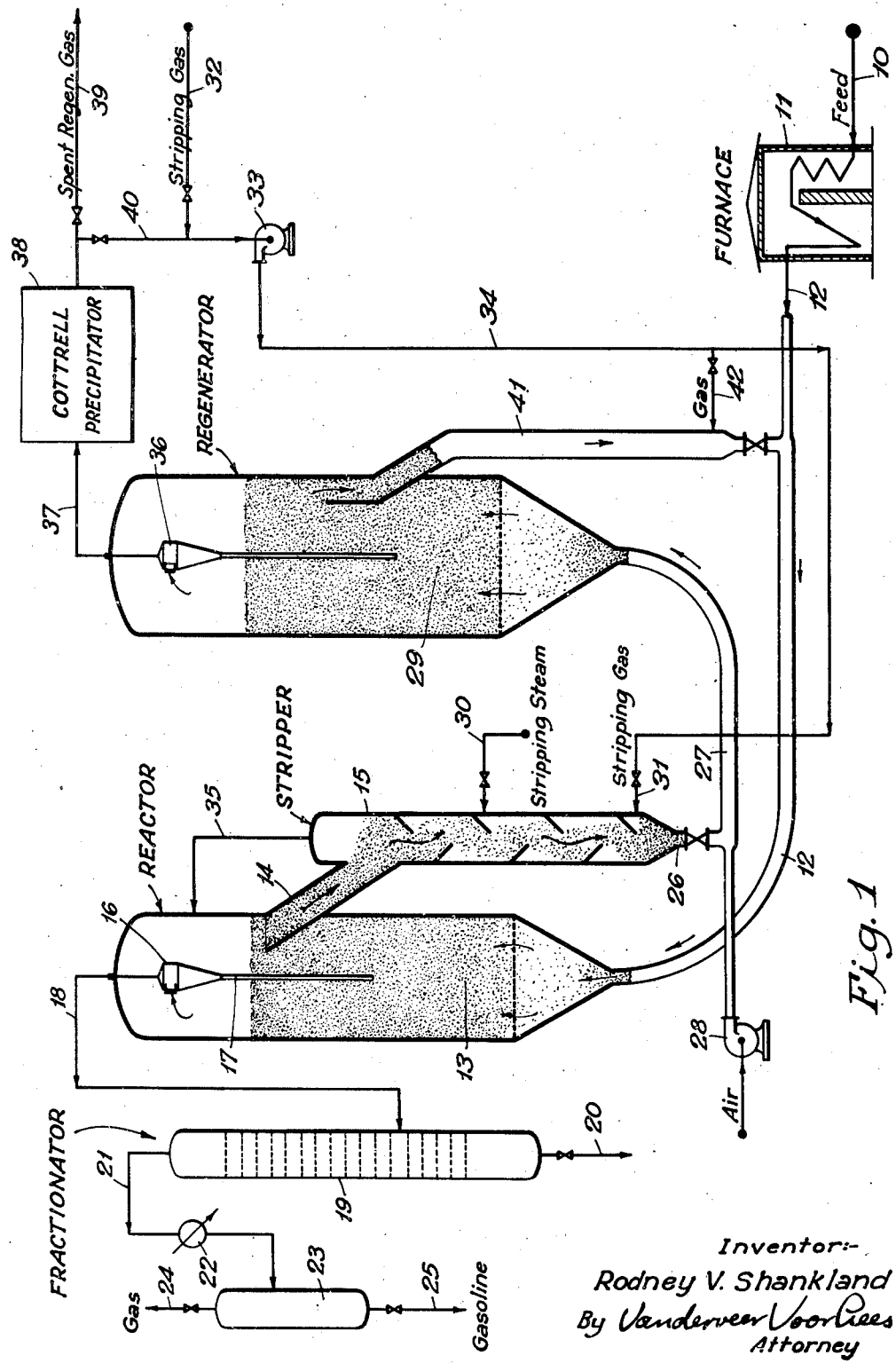

March 1, 1949.  R. V. SHANKLAND  2,463,434
TREATMENT OF FLUIDIZED SOLID CATALYST
Filed Dec. 22, 1944  2 Sheets—Sheet 2
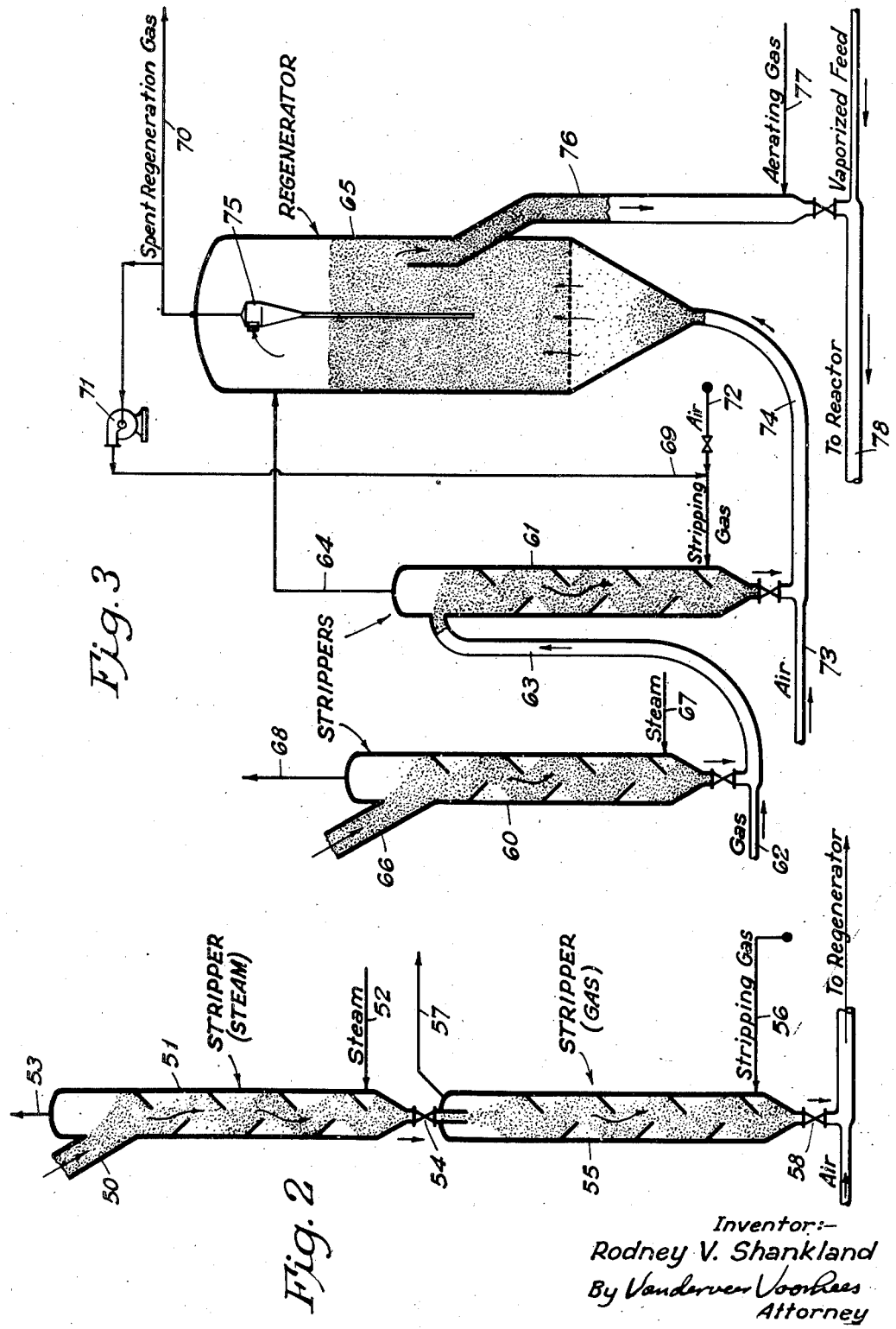
Inventor:—
Rodney V. Shankland
By Vanderver Voorhees
Attorney

UNITED STATES PATENT OFFICE 2,463,434

TREATMENT OF FLUIDIZED SOLID CATALYST

Rodney V. Shankland, Chicago, Ill., assignor to Standard Oil Company, Chicago, Ill., a corporation of Indiana Application December 22, 1944, Serial No. 569,386

7 Claims. (Cl. 196—52)

This invention relates to a process of hydrocarbon conversion and more particularly to a process of converting hydrocarbons by contacting with fluidized solid catalysts suspended in hydrocarbon vapors. One object of the invention is to facilitate the regeneration of the catalyst in a fluidized conversion system whereby the efficiency of the process may be increased. Another object of the invention is to increase the capacity of the hydrocarbon conversion system. Still another object of the invention is to decrease the load on the catalyst regenerator in a conversion system where the catalyst is recycled continuously between the reaction zone and the regeneration zone and where the regeneration is effected by combustion of carbonaceous deposits from the catalyst. Reduction in the rate of catalyst deactivation is also an object. Other objects of the invention will become apparent from the following description thereof:

In fluidized, solid catalyst hydrocarbon conversion processes, it is generally the practice to continuously or intermittently transfer partially spent catalyst from the reaction zone to a regeneration zone wherein it is brought in contact with a current of air or other oxygen-containing gas at a controlled elevated temperature usually in the range of 950 to 1200° F. In the regeneration zone the carbonaceous deposits are removed from the catalyst by combustion and pass off as carbon monoxide, carbon dioxide, and water, leaving the catalyst substantially in its original active condition. The catalyst is then conducted back to the reactor where it is employed to effect the conversion of additional quantities of hydrocarbons generally at a conversion temperature within the range of about 850 to 1050° F. Processes of this kind are employed in cracking of gas oil and residual oils, the reforming of low knock rating gasoline fractions, etc.

It has generally been the practice in processes of this kind to strip from the spent catalyst flowing from the reactor to the regenerator, hydrocarbon vapors absorbed on or entrained in the catalyst, thus preventing access of such volatilizable hydrocarbons to the regenerator where they would be subjected to combustion with consequent economic loss. Even more important than the economic loss of such hydrocarbon material, however, is the increased load which such combustible material imposes on the regenerator. In fact, the regeneration of the catalyst in a catalytic conversion system of this kind is not an inconsiderable item of expense because of the magnitude of the equipment and the power required to compress the air employed for the regeneration operation. Obviously any reduction which can be made in the amount of combustible matter conducted between the reactor and the regenerator favorably influences the economics of the process.

In the prior art processes, it has heretofore been the practice to strip volatilizable material from the spent catalyst in the stripping zone by means of stripping steam which is caused to flow countercurrent to a stream of catalyst, thus displacing hydrocarbon vapors occluded or adsorbed in the catalyst. The steam employed in this way commonly found its way into the reactor and escaped from the reactor with the reaction product vapors and was condensed and finally separated from the product as water. Some of this stripping steam, however, has been carried with the catalyst into the regenerator and it has been found that steam when allowed to gain access to the regeneration zone has had a serious deleterious effect upon the catalyst. The explanation of this phenomenon is not clear but there is some indication that in the presence of steam and oxidizing gas and at the temperatures existing in the regenerator, the aluminum oxide, silicon dioxide, and other metal oxides of which the catalyst is composed, undergo an allotropic rearrangement from an active to an inactive form. The amount of steam, or water, responsible for this effect is dependent on the condition of the catalyst, the temperature conditions, partial pressure of steam in the regeneration gas, etc. A small unavoidable concentration of steam, such as that generated by combustion of hydrocarbons adsorbed on the catalyst, ordinarily can be tolerated. However, any increment of steam above this is very undesirable. One of the objects of my invention is to prevent the access of stripping steam to the regenerator for this reason.

My invention is illustrated by drawings which show diagrammatically in Figure 1 a design of an apparatus for carrying out the process. Figure 2 shows a modified form of catalyst stripping apparatus while Figure 3 shows a third arrangement of the catalyst stripping apparatus providing for segregation of the stripping fluids employed.

Referring to Figure 1, the hydrocarbon feed is introduced by line 10 to furnace 11 where it is heated and at least partially vaporized and thence discharged by line 12 leading to reactor 13 where it is brought into contact with a fluidized mass of powdered or finely divided solid metal oxide catalyst maintained in dense, fluidized suspension therein by the action of the upflowing vapors.

It is generaly desirable that the vapors pass upward thru the reactor with a velocity of about 1 to 5 feet per second to maintain the catalyst in dense fluid suspension by the action of hindered settling. Catalysts of high density and relatively coarse particle size require higher vapor velocities, for example velocities as high as 10 feet per second. The catalyst employed in reactor 13 is commonly an oxide such as silica, alumina, magnesia, zirconia, thoria or boria, and generally mixtures of two or more of these oxides. Other metal oxides may be employed alone or in combination, particularly the oxides of the Sixth Group metals, especially chromium and molybdenum, and the oxides of vanadium and copper. A typical cracking catalyst is composed of active silica, e.g. silica gel, and 1 to 20 per cent of active alumina. Another suitable catalyst is active silica in combination with 15 to 30 per cent of calcined magnesia. Still another effective cracking catalyst is active alumina, e.g. alumina gel, and 10 to 20 per cent of boron oxide. Certain natural earth and clays may also be used as catalysts, a typical material of this kind being known as Super Filtrol, an acid-treated montmorillonite clay.

In general the catalyst employed in my process is most readily fluidized when the particle size is maintained within a range of about 50 to 350 mesh, although somewhat coarser and also finer particles, e. g. 20–40 microns may be present. It has been found that the coarser particles are more difficult to maintain in the desired fluidized condition while the finer particles tend to become lost from the system. The density of the catalyst in reactor 13 is usually about 5 to 35 pounds per cubic foot depending upon the character of the catalyst and the vapor velocity employed. In this range of density, generally about 10 to 25 pounds per cubic foot, the catalyst suspension behaves as a liquid and can be transported thru pipes in the same manner.

In the upper part of the reactor 13 the catalyst seeks a level and overflows by line 14 into stripper 15, leaving the vapors in the top of reactor 13 with very little catalyst suspended therein. This suspension of fine catalyst, generally well below one pound per cubic foot, is referred to as the "dilute phase" in the reactor. Most of this catalyst is separated from the vapors in cyclone separator 16 whence it is returned by dip leg 17 to the dense catalyst phase in the lower part of the reactor. The vapor substantially free of catalyst are conducted by vapor line 18 to fractionating tower 19 wherein heavier unconverted hydrocarbons are condensed and separated by line 20 and the gasoline vapors are withdrawn by line 21 leading to condenser 22 and thence to separator 23 from which gas is discharged by vent 24 and the gasoline product is removed by line 25. It is desirable to subject this gasoline stream to stabilization before placing it on the market, propane and lighter hydrocarbons being removed by fractionation.

In catalyst stripper 15, the catalyst flows downward over a series of baffles, if desired, leaving the stripper thru valve-controlled outlet 26 where it is rapidly dispersed in a stream of air in line 27 introduced by blower 28 and forced into regenerator 29. The density of the catalyst in the stripper may be about the same as that in the reactor, usually a little less as a result of the agitating and aerating effect of the upflowing stripping gas. Thus a density of about 5 to 30 lbs./cu. ft. may be the average in the stripper. In stripper 15 a current of stripping steam is injected at an intermediate point by line 30 flowing up thru the stripper countercurrent to the downflowing stream of catalyst and removing therefrom the major part of volatilizable hydrocarbons adsorbed on the catalyst and entrained therein. The amount of stripping steam required for this purpose is ordinarily about 6 to 20 pounds per ton of catalyst recycled. At a lower point in the stripper there is introduced by line 31 a current of inert stripping gas such as nitrogen or carbon dioxide which may be supplied by line 32, blower 33, and line 34. It is preferred that the inert stripping gas be relatively free of water vapor and in ordinary practice spent regeneration gas, to be described hereinafter, is satisfactory. The stripping gas passes upwardly thru stripper 15 countercurrently to the flow of catalyst therein and effectively sweeps from the catalyst any stripping steam occluded therein. The amount of stripping gas required for displacing steam from the catalyst is relatively small, generally about 30 to 100 cubic feet (standard conditions) per ton of catalyst. The mixture of stripping gas and stripping steam passes out thru the top of the stripper by line 35 leading back to the upper part of reactor 13 or is disposed of in some other manner, as by conducting it directly to the product recovery system, e. g. at fractionator 19, although some stripping gas will go into the reactor in any case thru line 14.

The catalyst at the bottom of stripper 15 now aerated with substantially water-free gas and in fluid form flows to the regenerator 29 where it is regenerated by combustion with air as hereinabove indicated. Spent regeneration gases pass thru cyclone separator 36 and thence are discharged by line 37 leading to Cottrell precipitator 38 where additional finely divided entrained catalyst is recovered. The spent regeneration gases are thence discharged from the system by line 39. A portion of the spent regeneration gas is directed thru line 40 to stripper 15 as hereinabove described. The amount of water vapor contained in this gas is small, commonly not more than 5 to 10 per cent by weight. If desired, the spent regeneration gas employed for use in stripper 15 may be specially dried by means of a desiccating agent such as calcium chloride or ignited silica gel to reduce its moisture content, although the cost of drying is not usually justified. It may also be desirable to dry the air employed for regeneration, particularly on days when the humidity is high and when the amount of water in the regenerator is near the critical concentration at which catalyst degeneration become excessive.

The regenerated catalyst in 29 is conducted by standpipe 41 to induction line 12 as hereinabove described whereby it is transferred back to the reactor for the treatment of additional hydrocarbon stock. The catalyst in standpipe 41 may be kept in fluidized condition by the introduction of aeration gas thru valved line 42.

Figure 2 illustrates an alternative arrangement of the catalyst stripper providing for separate disposition of the steam and the stripping gas leaving the stripper. Referring to the drawing, the stripping operation is conducted in two stages, the spent catalyst from the reactor being conducted by line 50 into steam stripper 51 where it is initially stripped with a current of steam introduced at 52. The steam and hydrocarbon vapors stripped from the catalyst are discharged by line 53 whereby they are returned to the reactor or to the hydrocarbon product recovery system. Hydrocarbon vapors recovered in this way are not contaminated with uncondensible gases and can be readily recovered by condensation of the steam.

The stripped catalyst passes from the bottom of 51 thru valve 54 into the second stage of the stripper 55 wherein it is countercurrently contacted with a current of water-free stripping gas introduced by line 56. The upflowing stream of gas displaces the steam from the catalyst and carries it away thru line 57 leading to the dilute catalyst phase in the top of the regenerator, to the Cottrell precipitator, to a flue or other disposal means not shown. If this gas stream containing steam is injected into the top of the regenerator, any catalyst which it may carry with it as entrainment can be recovered in the regenerator, while the water vapor which it contains will not adversely affect the catalyst in the regenerator, since contact therewith is avoided by introducing the moisture-laden gas into the dilute catalyst phase whence it is immediately discharged from the regenerator.

Moisture-free, stripped catalyst at the base of stripper 55 passes thence to the regenerator thru valve-controlled outlet 58.

Figure 3 describes another arrangement of the two-stage stripping apparatus similar to that shown in Figure 2 except that the stripping columns 60 and 61 are placed side-by-side and the catalyst is transferred from the bottom of the first stage stripper 60 by a stream of gas introduced by line 62 and carried by line 63 to the top of stripper 61. The carrier gas escapes with the gases from the stripper by line 64 leading to the dilute catalyst phase in the top of regenerator 65.

Spent catalyst from the reactor enters the stripper 60 by line 66 where it is contacted countercurrently with a stream of steam introduced at 67. The stream of stripping steam and hydrocarbon vapors is conducted by line 68 to the hydrocarbon recovery system.

The catalyst in stripper 61 is freed of steam by countercurrent contact with substantially water-free stripping gas introduced at 69, for example, spent regeneration gas withdrawn from vent line 70 by blower 71. It is sometimes desirable to provide additional heat to the catalyst in stripper 61 to still further increase the elimination of hydrocarbonaceous matter. This may be done either by superheating the stripping gas supplied by line 69 by means not shown or by introducing oxygen thereinto by valved inlet 72. For this purpose air is satisfactory. The amount of oxygen required is only sufficient to raise the temperature of the catalyst by exothermic combustion of carbon by an amount of 50 to 200 or 300° F. The stripped catalyst now free of steam is carried by the regeneration air introduced at 73 and conducted thru transfer line 74 to the regenerator 65. Spent regeneration gas is separated from catalyst in cyclone 75 before being discharged thru line 70 while the regenerated catalyst is conducted by standpipe 76 aerated with aeration gas introduced at 77 back to the reactor thru line 78 as described in connection with Fig. 1.

Having thus described my invention what I claim is:

1. In the process of converting hydrocarbons in the presence of fluidized solid catalysts of about 50 to 350 mesh wherein the catalyst in dense fluid suspension is contacted with the hydrocarbons at conversion temperature in a reaction zone until contaminated with carbonaceous deposits, after which it is conducted to a separate regeneration zone where the deposits are removed by combustion with an oxygen-containing gas at a high temperature of about 950 to 1200° F. and the regenerated catalyst is returned to the reaction zone, the improvement comprising removing volatilizable hydrocarbons from the catalyst flowing from the reaction zone to the regeneration zone by countercurrently stripping with steam, separating the major part of the steam and volatilized hydrocarbons from the said catalyst and thereafter displacing the residual steam from the stream of catalyst by countercurrently contacting it with a substantially moisture-free, inert stripping gas introduced at a low point in a downwardly moving column of said steam-stripped catalyst, separating said inert stripping gas from catalyst out of contact with said major part of the stripping steam, then introducing the stripped, substantially moisture-free catalyst into said regeneration zone.

2. The process of claim 1 wherein the moisture-free, inert stripping gas is comprised of spent regeneration gas discharged from said regeneration zone.

3. The process of claim 1 wherein the catalyst is maintained in a dense phase in the reaction zone below a dilute phase therein and a mixture of stripping steam and volatilized hydrocarbons removed from the catalyst in said steam-stripping operation is returned directly to the dilute phase above the reaction zone.

4. In the process of converting hydrocarbons in the presence of fluidized solid catalysts of about 50 to 350 mesh wherein the catalyst in dense phase is contacted with the hydrocarbons at conversion temperature in the reaction zone until contaminated with carbonaceous deposits, after which it is conducted to a separate regeneration zone where the deposits are removed from the catalyst in dense phase by combustion with an upflowing oxygen-containing gas at a high temperature of about 950 to 1200° F. and the regenerated catalyst is returned to the reaction zone, the improvement comprising separating volatilizable hydrocarbons from the catalyst flowing from said reaction zone to said regeneration zone by stripping in two successive countercurrent stages, employing steam as the stripping fluid in the first stage and discharging said steam and volatilized hydrocarbons into the product vapors from the reaction zone, injecting a substantially moisture-free inert stripping gas into the catalyst in the second stripping stage in sufficient amount to displace residual steam from the catalyst, separating said inert gas and steam from the catalyst and introducing it at a high point in said regeneration zone out of contact with the dense catalyst phase therein, and introducing the stripped steam-free catalyst into the regeneration zone.

5. In the process of converting hydrocarbons in the presence of a fluidized solid catalyst of about 50 to 350 mesh wherein the catalyst is contacted with hydrocarbons at conversion temperature in dense fluid suspension in a reaction zone until contaminated with carbonaceous deposits, after which it is conducted to a separate regeneration zone where the deposits are removed by combustion with an oxygen-containing gas at a high temperature of about 950 to 1200° F., the spent regeneration gases are separated from the catalyst and the regenerated catalyst returned to the reaction zone, the improvement comprising stripping volatilizable hydrocarbons from the catalyst flowing from the reaction zone to the regeneration zone by contacting it countercurrently with steam in a first stripping zone, removing steam and volatilized hydrocarbons from the catalyst stream, displacing residual steam from the catalyst in a second stripping zone by countercurrently contacting therein with a stream of said spent regeneration gas from said regeneration zone, separating said spent regeneration gas and residual steam from said catalyst and combining them with spent regeneration gas from said regeneration zone, and transferring the substantially steam-free catalyst from said second stripping zone to said regeneration zone in contact with oxygen therein.

6. In the process of converting hydrocarbons in the presence of fluidized solid catalysts of about 50 to 350 mesh wherein the catalyst is contacted with the hydrocarbon at conversion temperature in a reaction zone until contaminated with carbonaceous deposits, after which it is conducted to a separate regeneration zone where the deposits are removed by combustion with an oxygen-containing gas at a high temperature of about 950 to 1200° F., spent regeneration gas is discharged from said regeneration zone and the regenerated catalyst is returned to the reaction zone, the improvement comprising stripping volatilizable hydrocarbons from the catalyst growing from the reaction zone to the regeneration zone by contacting with a relatively large amount of steam, separating said steam with volatilized hydrocarbon vapors from said catalyst and combining them with conversion products produced in said reaction zone, displacing residual steam from the stream of catalyst by injecting into it a relatively small amount of substantially moisture-free inert stripping gas, removing said stripping gas and residual steam from said catalyst and discharging them into said spent regeneration gas and introducing the stripped catalyst into said regeneration gas in contact with oxygen therein.

7. The process of claim 6 wherein the amount of steam employed is about 6 to 20 pounds per ton of catalyst recycled and the amount of stripping gas employed is about 30 to 100 cubic feet measured at standard conditions per ton of catalyst recycled.

RODNEY V. SHANKLAND.

REFERENCES CITED

The following references are of record in the file of this patent:

UNITED STATES PATENTS

| Number | Name | Date |
|---|---|---|
| 2,300,151 | Hemminger | Oct. 27, 1942 |
| 2,331,433 | Simpson et al | Oct. 12, 1943 |
| 2,374,151 | Wolk et al | Apr. 17, 1945 |
| 2,377,078 | Gerhold | May 29, 1945 |
| 2,391,944 | Carlsmith | Jan. 1, 1946 |
| 2,393,839 | Thomas et al | Jan. 29, 1946 |
| 2,408,943 | Mekler | Oct. 8, 1946 |
| 2,414,002 | Thomas et al | Jan. 7, 1947 |

FOREIGN PATENTS

| Number | Country | Date |
|---|---|---|
| 115,689 | Australia | Aug. 6, 1942 |

Certificate of Correction

March 1, 1949.

Patent No. 2,463,434.

RODNEY V. SHANKLAND

It is hereby certified that errors appear in the printed specification of the above numbered patent requiring correction as follows:

Column 3, line 52, for "vapor" read *vapors*; column 4, line 55, for "become" read *becomes*; column 7, line 27, for "growing" read *flowing*; and that the said Letters Patent should be read with these corrections therein that the same may conform to the record of the case in the Patent Office.

Signed and sealed this 9th day of August, A. D. 1949.

[SEAL]

THOMAS F. MURPHY,
*Assistant Commissioner of Patents.*